United States Patent [19]

Fisher et al.

[11] 4,149,683

[45] Apr. 17, 1979

[54] SAFETY BELT TENSION ELIMINATOR WITH WEBBING SENSITIVE RELEASE

[75] Inventors: Robert C. Fisher, West Palm Beach, Fla.; Cecil A. Collins, Pontiac, Mich.

[73] Assignee: The Firestone Tire and Rubber Company, Akron, Ohio

[21] Appl. No.: 920,352

[22] Filed: Jun. 29, 1978

[51] Int. Cl.² .................. A62B 35/00; B65H 75/48
[52] U.S. Cl. ................................................. 242/107.7
[58] Field of Search ... 242/107.7, 107.6, 107.4 R–107.4 E, 242/107.12, 107.13; 297/388; 280/744–747

[56] References Cited

U.S. PATENT DOCUMENTS

| | | |
|---|---|---|
| 4,002,311 | 1/1977 | Fisher et al. .................. 242/107.7 |
| 4,065,072 | 12/1977 | Magyar ........................... 242/107.7 |

*Primary Examiner*—Harvey C. Hornsby
*Assistant Examiner*—John M. Jillions
*Attorney, Agent, or Firm*—Harness, Dickey & Pierce

[57] ABSTRACT

The disclosure relates to a mechanical release for the comfort mechanism of a safety belt retractor. The release precludes inadvertent lockup of the retractor system when the safety belt is substantially fully extended.

7 Claims, 7 Drawing Figures

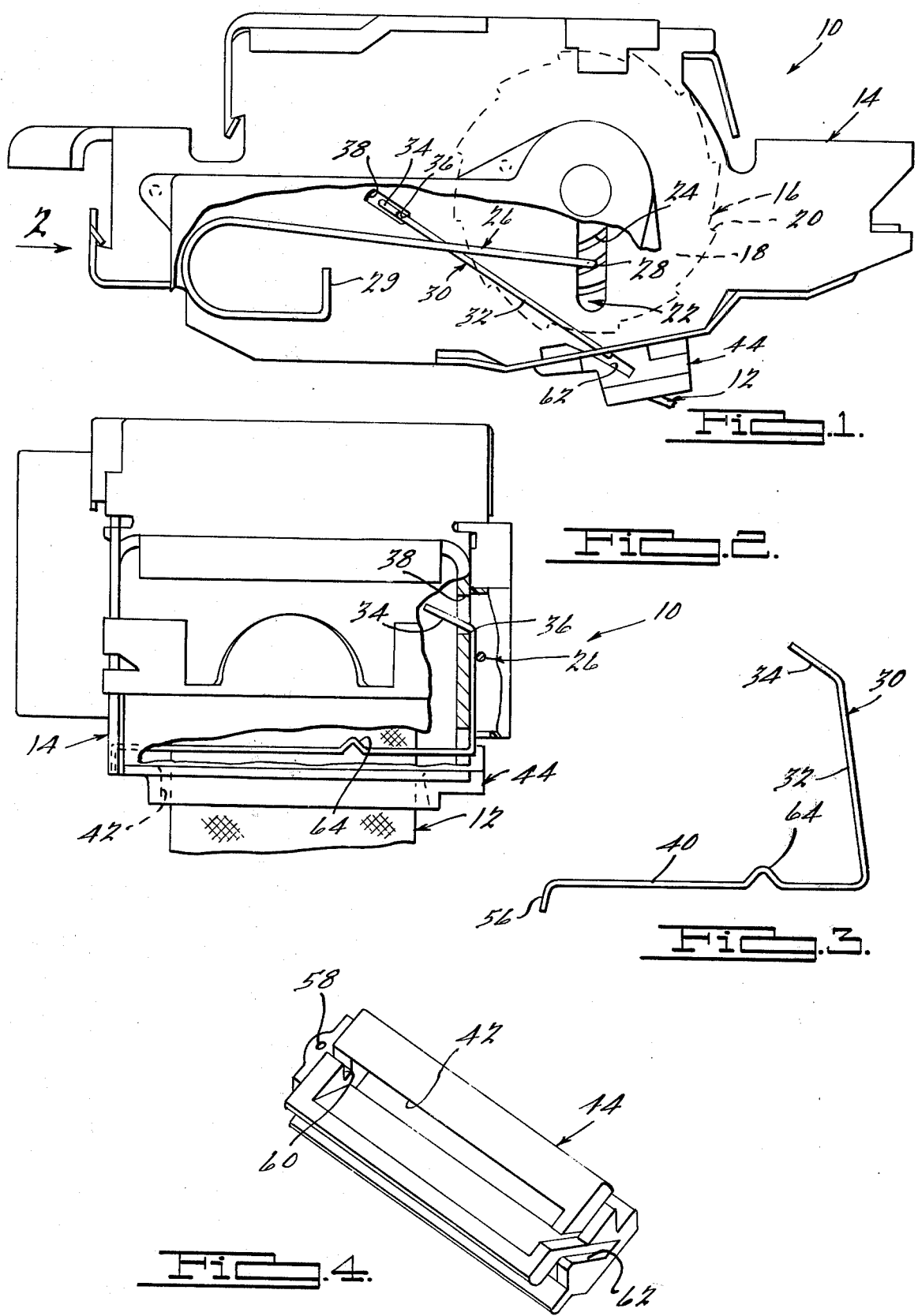

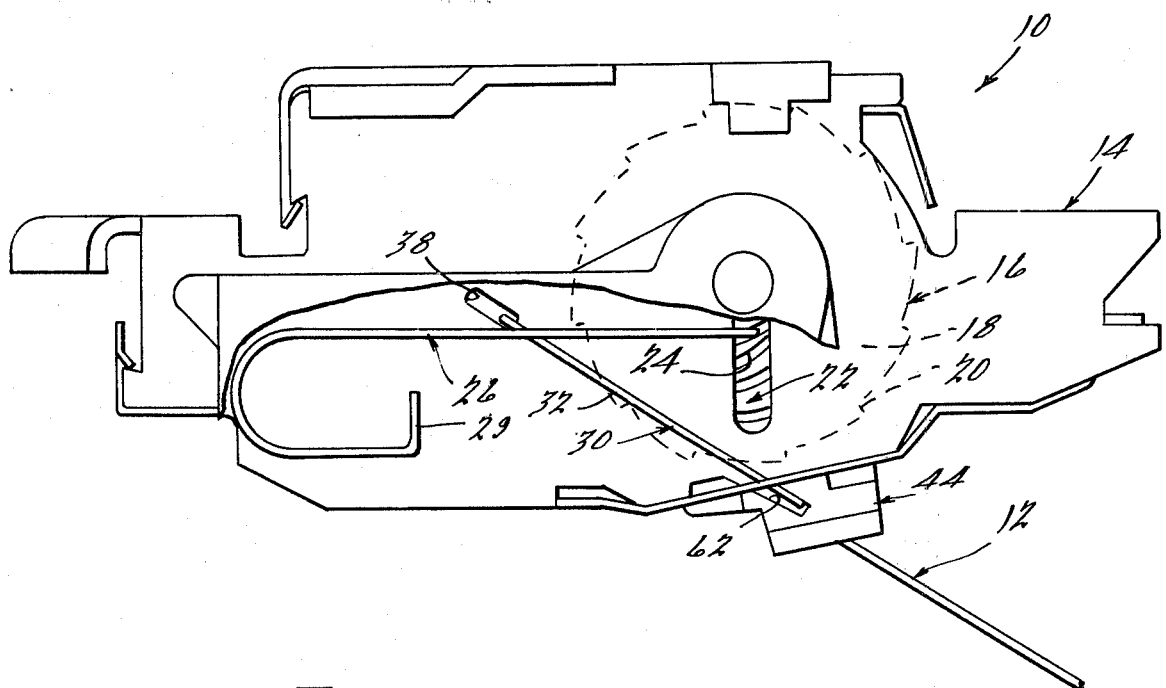
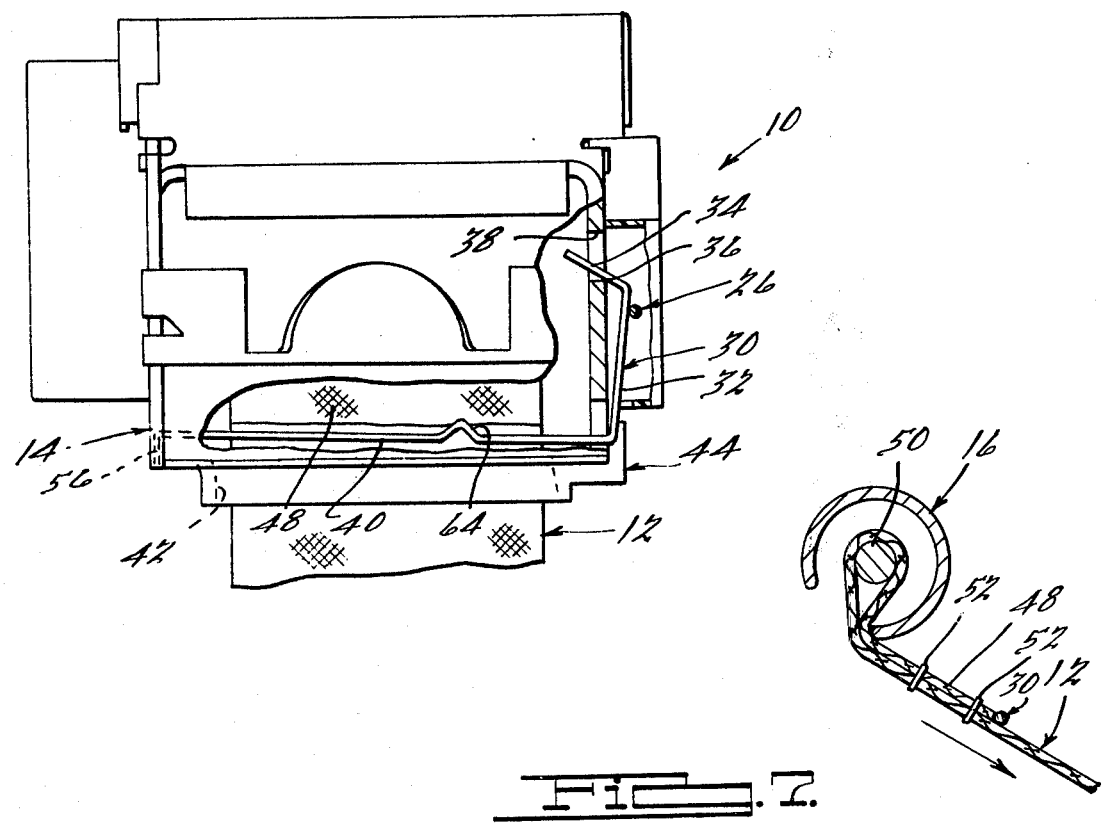

SAFETY BELT TENSION ELIMINATOR WITH WEBBING SENSITIVE RELEASE

BACKGROUND OF THE INVENTION

Safety belts are normally protracted by a user to a position beyond that required for use, buckled to an element that is affixed to the structure of the vehicle, and thereafter allowed to retract against the body of the user. The belt is automatically locked against further protraction thereby to secure the user in the seat in the event of sudden vehicle deceleration.

Since retraction of the safety belt is spring biased, pressure on the body of the user is sometimes uncomfortable. To alleviate this problem, comfort mechanisms have been devised to restrain the retraction force on the belt. Such comfort mechanisms require a slight protraction after retraction of the belt to effect lockup. Release of the comfort mechanism requires yet another protraction, which, when the belt is substantially fully extended, may be impossible without disconnecting the belt from its anchor, or opening the vehicle door.

The comfort mechanism comprises a plastic disc which is attached to the spool of the retractor and which is provided with a track on an external face adapted to receive a spring wire follower which rides therein.

As taught in our U.S. Pat. No. 4,002,311, the contents of which are incorporated herein by reference, the comfort mechanism disc has a first track portion within which the end of the spring follower travels during initial protraction of the belt.

A second track portion is disposed radially outwardly of the first track and communicates therewith to perform a double function; first, to receive the follower when the belt is initially retracted following the initial protraction, and, second, to permit continuous retraction of the belt when the belt is unlatched by the user and the belt is returned to the housing.

A third or control portion of the track is in open communication with the second track and forms a continuation thereof in the direction of protraction relative to the follower. The follower is engageable with a stop in the third track upon a subsequent but limited protraction of the belt initiated by the user to relieve tension Disengagement of the follower and the stop is achieved either by protraction of the belt by the user or by a mechanical or electromechanical release operating in response to the user's unlatching of the belt. Because a certain amount of protraction of the belt is sometimes necessary to disengage the stop, disengagement may be rendered impossible when the belt is substantially entirely protracted from the retractor.

SUMMARY OF THE INVENTION

In accordance with the present invention, protraction of the belt to the end thereof results in engagement between the belt and a spring wire cam which lifts the follower from engagement with the stop in the track of the comfort mechanism control disc.

BRIEF DESCRIPTION OF THE DRAWINGS

FIG. 1 is a side elevational view of the retractor of the present invention with a part of the casing removed;

FIG. 2 is an end view taken substantially in the direction of arrow 2 of FIG. 1;

FIG. 3 is an enlarged view of the follower release of the present invention;

FIG. 4 is a view of the belt guide;

FIG. 5 is a view similar to FIG. 1, but with the follower released;

FIG. 6 is an end view similar to FIG. 2 of the retractor shown in FIG. 5;

FIG. 7 is a schematic view showing engagement of the belt with the release.

DESCRIPTION OF THE PREFERRED EMBODIMENTS

Referring to FIG. 1, a retractor 10 is adapted to be mounted on a vertical pillar (not shown) on the interior of a vehicle. A shoulder belt 12 projects from the retractor 10 so that it can be extended over the shoulder and across the chest of the vehicle occupant.

The retractor 10 comprises a housing 14 within which a spool 16 is mounted. The spool 16 includes a pair of end flanges 18, each of which is formed with ratchet teeth 20. The spool 16 is spring biased to normally retract the belt 12, but may be locked against rotation in the unwinding direction in a manner taught in U.S. Pat. No. 4,014,480.

As taught in our U.S. Pat. No. No. 4,002,311, a comfort lock mechanism is combined with the belt retractor 10 and includes a plastic disc 22 which incorporates a track or race 24. A follower 26 has an inwardly bent end portion 28 that is slidably received within the track 24. The follower 26 comprises a spring wire having an anchored end 29 so that the inwardly bent end 28 is self-biased into the grooves 24 and radially inwardly toward the axis of rotation of the disc 22.

The configuration and function of the track 24 in cooperation with the follower 26 are fully described in our U.S. Pat. No. 4,002,311. However, in brief, the disc 22 comprises a track 24 having first, second and third portions.

The first track portion is substantially concentric with the center of the disc 22 and extends into communication with the second track. The second and third track portions comprise sections in communication with the first track at their junctures by means of ramps which terminate in stop shoulders.

In normal use of the belt retractor 10, protraction continues until the belt 12 is extended to such a length that the free end thereof can be latched in a buckle in the usual way. The normal spring bias of the retractor 10 exerts a retraction force on the belt 12 to tighten the belt 12 against the chest of the user. To alleviate this pressure, the user effects a slight protraction of the belt 12 thereby causing the end 28 of the follower 26 to move past a stop shoulder in the second track of the disc 22.

When the user then releases the belt 12, the end 28 of the follower 26 is caught behind the closest stop shoulder to prevent further clockwise movement of the disc 22, i.e. prevent any further retraction of the belt 12. Thus, the pressure exerted by the belt 12 on the users chest is relieved. It is thus within the operator's control to protract the belt 12 to a desired position permitting the follower 26 to drop behind a selected stop. The belt 12 cannot be further protracted in the event of a sudden change in vehicle velocity because the ratchet teeth 20 on the spool 16 would be engaged by a pawl to prevent protraction in the manner taught in U.S. Pat. No. 4,014,480.

The belt 12 may be returned to its fully retracted condition by first protracting the belt 12 so that the disc 22 is moved counter-clockwise. The follower 26 moves to the end of the third track and is lifted, at which point it is free to snap radially inwardly into its initial position.

However, in the event the belt 12 is protracted to a point that the disc 22 cannot be further rotated counter-clockwise, release of the follower 26 is not possible without disconnect of the belt 12 from its complimentary buckle, or, in some installations, opening of the vehicle door.

To solve this problem, and in accordance with the present invention, a mechanism is provided comprising a spring wire release lever 30 which is slidably mounted on the housing 14. The lever 30 has an arm 32 which extends under the follower 26 to effect lifting thereof when a cam finger 34 at the end of the arm 32 engages an edge portion 36 of a slot 38 in the housing 14. The arm 32 has a belt engaging portion 40 extending laterally across an opening 42 in a belt guide 44. An end portion 56 of the lever 30 anchors the lever 30 in a complimentary aperture 58 in the guide 44. The lever 30 is guided for movement relative to the housing 14 of the retractor 10 by slots 60 and 62 in the belt guide 44.

As best seen in FIG. 7, the belt 12 has an end portion 48 extending about a pin 50 of the spool 16. The belt portion 48 is stitched at 52 to form a double thickness of belt. When the belt 12 is fully protracted the doubled-up end portion 48 thereof engages the portion 40 of the lever 30 to bias the lever 30 to the right as seen by comparing FIGS. 1 and 5 of the drawings. As the arm 30 moves to the right, as seen in FIG. 5, the cam finger 34 on the lever 30 rides up on the edge 36 of the slot 38 in the housing 14 to lift the lever 30 which in turn lifts the follower 26 to disengage the follower from its stop in the disc 22. A detent 64 in the lever 30 facilitates engagement thereof with the end portion 48 of the belt 12.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A safety belt retractor comprising a frame, a spool on said frame, a belt on said spool, means resiliently biasing said spool in a belt retracting direction, a track on said spool having a stop therein and adapted to receive a follower, a follower in said track having an operative portion in engagement with said stop to prevent retraction of the belt until protracted by the user, said follower being normally biased to an inoperative position, and means on said housing engageable with said belt upon protraction thereof to effect disengagement of said follower from the stop in said track thereby to facilitate movement of the follower to said inoperative position.

2. A safety belt retractor in accordance with claim 1 wherein said disengagement means comprises a slidable lever supported by said frame, said lever having one portion thereof engageable with the follower and another portion engageable with the belt.

3. A safety belt retractor in accordance with claim 2 wherein said one portion of the lever includes a cam finger thereon engageable with a complimentary cam surface on said frame for camming said one portion of the lever to a position disengaging the follower from the stop in said track.

4. A safety belt retractor in accordance with claim 1 wherein said belt has a doubled-up portion engageable by said disengagement means for moving said disengagement means to a position to effect disengagement of said follower from the stop in said track.

5. A safety belt retractor in accordance with claim 2 wherein said lever is of L-shaped configuration one end of which is supported by said frame.

6. A safety belt retractor in accordance with claim 2 wherein said lever extends between said follower and said frame.

7. A safety belt retractor in accordance with claim 3 wherein said frame cam surface comprises the edge of a slot.

* * * * *